United States Patent
Dillon

(10) Patent No.: US 12,008,921 B2
(45) Date of Patent: Jun. 11, 2024

(54) SYSTEMS AND METHODS FOR GRAPHEME-PHONEME CORRESPONDENCE LEARNING

(71) Applicant: 617 Education Inc., Washington, DC (US)

(72) Inventor: Tom Dillon, Washington, DC (US)

(73) Assignee: 617 Education Inc., Washington, DC (US)

( * ) Notice: Subject to any disclaimer, the term of this patent is extended or adjusted under 35 U.S.C. 154(b) by 0 days.

(21) Appl. No.: 18/152,625

(22) Filed: Jan. 10, 2023

(65) Prior Publication Data

US 2023/0343235 A1    Oct. 26, 2023

Related U.S. Application Data

(60) Provisional application No. 63/363,406, filed on Apr. 22, 2022.

(51) Int. Cl.
*G09B 7/04*    (2006.01)
*G06F 3/16*    (2006.01)
(Continued)

(52) U.S. Cl.
CPC ............ *G09B 7/04* (2013.01); *G06F 3/167* (2013.01); *G09B 19/04* (2013.01); *G10L 15/02* (2013.01);
(Continued)

(58) Field of Classification Search
CPC ......... G10L 2015/025; G10L 2015/225; G06F 3/167; G09B 19/04; G09B 7/04
See application file for complete search history.

(56) References Cited

U.S. PATENT DOCUMENTS 5,920,838 A * 7/1999 Mostow ............... G09B 5/065
704/266
6,963,841 B2 * 11/2005 Handal ................. G09B 19/04
704/251
(Continued)

OTHER PUBLICATIONS

Mostow, "Why and How Our Automated Reading Tutor Listens," Project LISTEN (www.cs.cmu.edu/~listen), School of Computer Science, Carnegie Mellon University, Jun. 2012, 10 pages.
(Continued)

*Primary Examiner* — Xuan M Thai
*Assistant Examiner* — Sadaruz Zaman
(74) *Attorney, Agent, or Firm* — Vorys, Sater, Seymour and Pease LLP; Michael Messinger

(57) ABSTRACT

Systems and methods are described for grapheme-phoneme correspondence learning. In an example, a display of a device is caused to output a grapheme graphical user interface (GUI) that includes a grapheme. Audio data representative of a sound made by the human user is received based on the grapheme shown on the display. A grapheme-phoneme model can determine whether the sound made by the human corresponds to a phoneme for the displayed grapheme based on the audio data. The grapheme-phoneme model is trained based on augmented spectrogram data. A speaker is caused to output a sound representative of the phoneme for the grapheme to provide the human with a correct pronunciation of the grapheme in response to the grapheme-phoneme model determining that the sound made by the human does not correspond to the phoneme for the grapheme.

23 Claims, 7 Drawing Sheets

(51) Int. Cl.
*G09B 19/04* (2006.01)
*G10L 15/02* (2006.01)
*G10L 15/06* (2013.01)
*G10L 15/22* (2006.01)
*G10L 25/18* (2013.01)
*G10L 25/30* (2013.01)

(52) U.S. Cl.
CPC ............ *G10L 15/063* (2013.01); *G10L 15/22* (2013.01); *G10L 25/18* (2013.01); *G10L 25/30* (2013.01); *G10L 2015/025* (2013.01); *G10L 2015/225* (2013.01)

(56) References Cited

U.S. PATENT DOCUMENTS

| | | | | |
|---|---|---|---|---|
| 7,280,964 | B2 * | 10/2007 | Wilson | G10L 15/187 |
| | | | | 704/251 |
| 9,697,822 | B1 * | 7/2017 | Naik | G10L 15/22 |
| 10,199,051 | B2 * | 2/2019 | Binder | G10L 15/26 |
| 10,210,861 | B1 * | 2/2019 | Arel | G06N 3/044 |
| 10,311,980 | B2 * | 6/2019 | Kim | A61B 5/4803 |
| 10,559,299 | B1 * | 2/2020 | Arel | G10L 15/02 |
| 11,004,443 | B2 * | 5/2021 | Yu | G06N 3/044 |
| 11,158,320 | B2 * | 10/2021 | Scanlon | G06F 21/32 |
| 11,282,512 | B2 * | 3/2022 | Yang | G10L 15/02 |
| 11,308,939 | B1 * | 4/2022 | Gao | G10L 15/142 |
| 11,373,633 | B2 * | 6/2022 | Chicote | G06F 40/30 |
| 11,410,639 | B2 * | 8/2022 | Trueba | G10L 13/06 |
| 11,410,684 | B1 * | 8/2022 | Klimkov | G10L 25/78 |
| 11,488,489 | B2 * | 11/2022 | Burdis | G09B 19/04 |
| 11,580,955 | B1 * | 2/2023 | Meng | G10L 13/047 |
| 11,676,572 | B2 * | 6/2023 | Peddinti | G10L 13/08 |
| | | | | 704/260 |
| 11,682,318 | B2 * | 6/2023 | Jochim | G09B 19/06 |
| | | | | 434/157 |
| 11,741,941 | B2 * | 8/2023 | Richards | G06F 3/167 |
| | | | | 704/259 |
| 2020/0286490 | A1 * | 9/2020 | Scanlon | G10L 17/04 |

OTHER PUBLICATIONS

"Amira Is Science Of Reading," Amira Learning—White Paper, https://amiralearning.com/documents/White-Paper-Amira-Is-The-Science-Of-Reading.pdf, Jun. 15, 2023, 31 pages.

Mostow, "Lessons from Project LISTEN: What Have We Learned from a Reading Tutor That Listens?" AIED 2013: Artificial Intelligence in Education, pp. 557-558.

Mostow et al., "Generating Instruction Automatically for the Reading Strategy of Self-Questioning," Proceedings of the 2009 conference on Artificial Intelligence in Education: Building Learning Systems that Care: From Knowledge Representation to Affective Modelling, Jul. 2009, pp. 465-472.

"Research Foundations: Evidence Base," Amira Learning, Houghton Mifflin Harcourt, https://www.hmhco.com/research/amira-learning-research-evidence-base, 54 pages.

* cited by examiner

SYSTEMS AND METHODS FOR GRAPHEME-PHONEME CORRESPONDENCE LEARNING

RELATED APPLICATION

This application claims priority to U.S. Provisional Application No. 63/363,406, filed Apr. 22, 2022, the subject matter of which is incorporated herein by reference in its entirety.

TECHNICAL FIELD

The present disclosure relates to systems and methods for speech repetition and more particularly to grapheme-phoneme correspondence learning.

BACKGROUND

A grapheme is a written symbol that represents a sound (e.g., phoneme). This can be a single letter, or could be a sequence of letters. When a human says a sound corresponding to a letter, for example, a spoken letter "t", this is a phoneme, and the written letter "t" is a grapheme. A digraph is a pair of characters or letters used together to represent a single sound, such as "ch" in English. A grapheme that consists of two letters is called a digraph, while one with three is called a trigraph. A collection of graphemes and/or digraphs can be used to represent a word and syllable. Phonemes can be combined to form syllables and words. For example, the word "kitty" is composed of four distinct sounds, or phonemes. Phonemes of graphemes and/or digraphs can be combined to represent morphemes, which is a small unit having a meaning (e.g., a base word, prefix, or suffix). Graphemes can also be arranged in no particular order to form a non-sensical word (e.g., "vang").

SUMMARY

In an example, a system can include memory to store machine-readable instructions, and one or more processors to access the memory and execute the machine-readable instructions. The machine-readable instructions can include a spectrogram generator that can be programmed to provide spectrogram data based on audio data representative of one or more sounds corresponding to one or more phonemes. The machine-readable instructions can further include a data augmentor that can be programmed to augment the spectrogram data to provide augmented spectrogram data, and a trainer that can be programmed to train a grapheme-phoneme model during a first training phase based on a first portion of the augmented spectrogram data, and re-train the grapheme-phoneme model during a second training phase based on a second portion of the augmented spectrogram data to provide a trained grapheme-phoneme model for determining whether a sound made by a human is representative of a phoneme for a grapheme.

In yet another example, a device can include a display, a speaker, memory to store machine-readable instructions, and one or more processors to access the memory and execute the machine-readable instructions. The machine-readable instructions can include a trained machine learning (ML) model that can be programmed to determine whether a sound made by a human corresponds to a phoneme for a grapheme displayed on the display, and a grapheme-phoneme module programmed to cause the speaker to output a sound representative of the phoneme for the grapheme in response to the trained ML model determining that the sound made by the human does not match the phoneme for the grapheme on the display.

In a further example, a method can include causing a display of a device to output a grapheme graphical user interface (GUI) that includes a grapheme, receiving audio data representative of a sound made by the human in response to the grapheme being displayed on the display, providing the audio data to a trained neural network to determine whether the sound made by the human corresponds to a phoneme for the grapheme, and causing a speaker of the device to output a sound representative of the phoneme for the grapheme in response to determining that the sound made by the human does not correspond to the phoneme for the grapheme.

In additional example, a computer-implemented system can include a tool that can be configured to output a user-interface display view that shows a user a series of graphemes, prompt the user to say the sound each grapheme makes, and capture one or more spoken responses from the user in an audio file. The system can further include a trained neural network model that can be configured to recognize individual grapheme sounds spoken out loud in isolation. The tool can output the audio file to the trained neural network model to evaluate whether a response was correct or mistaken. The tool can include a feedback mechanism that can be configured to provide modeling and repetition to the user when a mistaken response is detected.

Further embodiments, features, and advantages of the invention, as well as the structure and operation of the various embodiments of the invention are described in detail below with reference to accompanying drawings.

DETAILED DESCRIPTION

Figure 1:
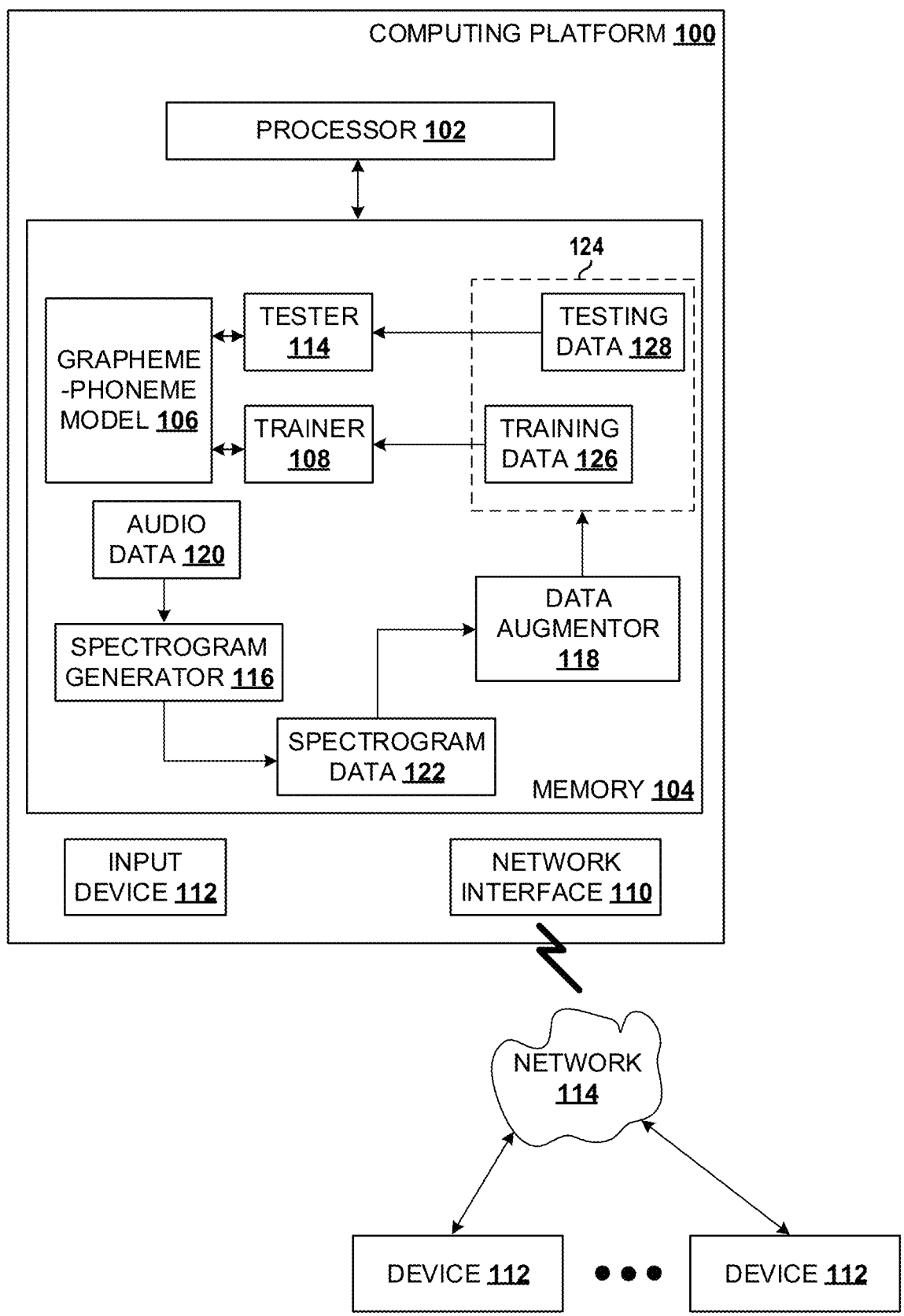
FIG. 1 is an example of a computing system for training a grapheme-phoneme model for grapheme-phoneme correspondence learning.

Letter-sound correspondence, or a relationship of graphemes (e.g., in an alphabet) to phonemes (e.g., sounds) produced, is a component of alphabetic principle and learning to read. Letter-sound correspondence refers to an identification of sounds associated with individual letters and letter combinations. For example, teaching students letter-sound correspondence is part of the curriculum and educational objectives of individuals, schools, teachers, learning centers, and other educational entities. Letter-sound correspondence (the linking in a brain of an abstract symbol ("A") with the sound: "/ah/") is learned through repetition. To learn proper letter-sound correspondence requires immediate correction (e.g., when a human makes a mistake) and modeling (e.g., demonstrating a correct sound for a letter for the human to repeat). Generally, an instructor (e.g., teacher) is assigned a number of students (e.g., twenty or more students) and demonstrates the letter-sound correspondence to all the students, however, is unable to confirm that individual students are producing the correct letter sound.

The present disclosure describes automated grapheme-phoneme practice with real-time feedback and modeling. The term "grapheme" as used herein can refer to a symbol (e.g., a letter), a combination of symbols (e.g., letters defining a digraph, a trigraph, or a blend (e.g., a consonant blend), etc.), and/or a word (e.g., sensical (e.g., having a known meaning) or non-sensical, a blend, a syllable, a morpheme, etc.). While the term "phoneme" as used herein can refer to a single unit of sound, a combination of units of sounds (e.g., combined to represent a word and/or syllable). Thus, in some examples, the system and methods described herein can be used for symbol-sound, word-sound practice, or any type of grapheme-sound association. In embodiments, computer-implemented methods, systems and devices for automated letter sound practice with real-time feedback and modeling are provided. In one embodiment, a computer-implemented tool outputs a user-interface display view that shows students a series of letters. Students are prompted to say the sound each letter makes, one after another. Beneath the user interface is a deep neural network that is trained to recognize individual letter sounds spoken out loud in isolation. This neural network model is linked to an error correction protocol—in the event of a mistake, the software immediately offers modeling (saying the letter sound correctly) followed by an opportunity for the student to repeat the sound correctly. A feedback mechanism is used to feed students a mix of letters with which they are struggling and those that they have mastered.

In one embodiment, the tool can be provided by elementary school teachers, tutors, and parents to students to help students learn their letter sounds independently. Learning letter sounds is the foundation for all other reading skills. The tool can be used as part of an educational program or as part of an intervention to improve the phonics skills of students in need. The tool can also be used for diagnostic, formative, and summative assessment.

One advantage is that a tool with a feedback mechanism as described herein can recognize and/or classify a spoken letter sound and provide immediate feedback in the event of an error, modeling of the correct sound, and an opportunity for the student to repeat the letter.

Examples are described herein for speech repetition for grapheme-phoneme correspondence learning. For example, a grapheme-phoneme model can be trained to determine whether a sound made by a human corresponds to a phoneme for a grapheme based on augmented spectrogram data. A grapheme-phoneme module can output a grapheme GUI that includes a respective grapheme, which can be rendered on a display of a user device. Audio data representative of a sound made by the human is received based on the respective grapheme shown on the display. The grapheme-phoneme model can determine whether the sound made by the human corresponds to a given phoneme for the respective grapheme based on the audio data. The grapheme-phoneme module can cause a speaker to output a sound representative of the given phoneme for the respective grapheme to provide the human with a correct pronunciation of the respective grapheme in response to the grapheme-phoneme model determining that the sound made by the human does not correspond to the phoneme for the grapheme.

Computing Platform

FIG. 1 is an example of a computing platform 100. The computing platform 100 can be any type of computing device having one or more processors 102 and memory 104. For example, the computing device can be a workstation, mobile device (e.g., a mobile phone, personal digital assistant, tablet or laptop), computer, server, computer cluster, server farm, game console, set-top box, kiosk, embedded device or system, or other device having at least one processor and computer-readable memory. In addition to at least one processor and memory, such a computing device may include software, firmware, hardware, or a combination thereof. Software may include one or more applications and an operating system. Hardware can include, but is not limited to, a processor, memory and user interface display or other input/output device.

Grapheme-Phoneme Model Training

As described herein, the computing platform 100 can be used for training a grapheme-phoneme model 106, which as described herein is used for grapheme-phoneme correspondence learning (e.g., letter to sound, word to sound, and other language correspondences). The grapheme-phoneme model 106 can be trained by a trainer 108, as described herein. By way of example, the grapheme-phoneme model 106 can be implemented as a neural network model, however, in other examples, a different ML model may be used and the trainer 108 can be configured to support training of this model. In some examples, the grapheme-phoneme model 106 may be implemented as a deep neural network, such as a residual network (e.g., a residual convolution network, such as MobileNetV2). Examples of neural networks can include a perceptron model, a feed forward neural network, a multilayer perceptron model, a convolutional neural network, a radial Basis function neural network, a recurrent neural network, a long short term memory neural network, a sequence to sequence model, and a modular neural network.

By way of example, the memory 104 can be implemented, for example, as a non-transitory computer storage medium, such as volatile memory (e.g., random access memory), non-volatile memory (e.g., a hard disk drive, a solid-state drive, a flash memory, or the like) or a combination thereof. The processor 102 could be implemented, for example, as a processor core. The memory 104 can store machine-readable instructions that can be retrieved and executed by the processor 102 to implement training of the grapheme-phoneme model 106. For example, the computing platform 100 could be implemented in a computing cloud. In such a situation, features of the computing platform 100, such as the processor 102, the memory 104, and a network interface 110 could be representative of a single instance of hardware or multiple instances of hardware with applications executing across multiple of instances (e.g., distributed) of hardware (e.g., computers, routers, memory, processors, or a combination thereof). Alternatively, the computing platform 100 could be implemented on a single dedicated server or workstation.

Figure 2:
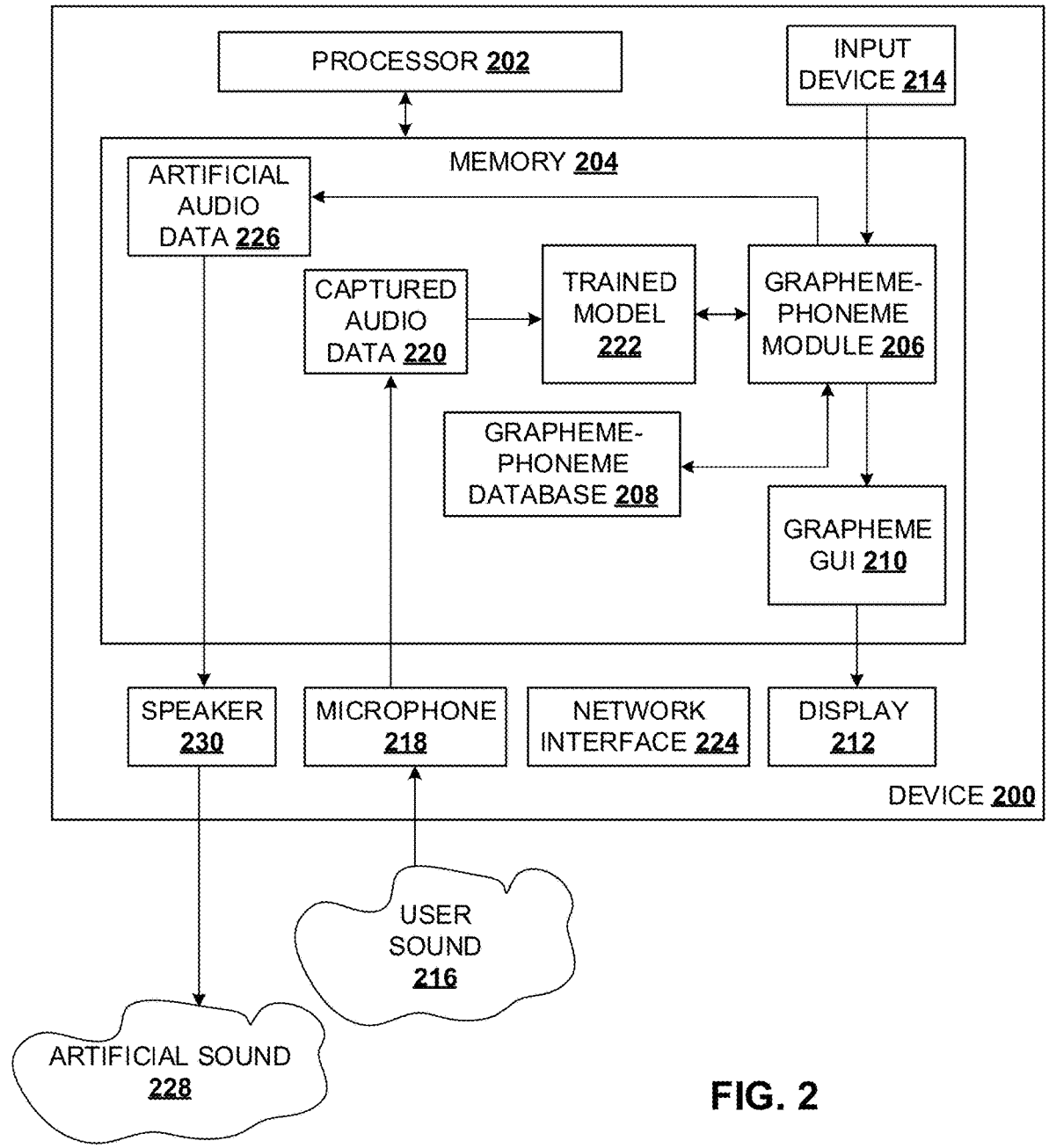
FIG. 2 is an example of a user device for grapheme-phoneme correspondence learning.

The network interface 110 (e.g., a network interface card) can be configured to communicate with a number of devices 112, as shown in FIG. 1. In some examples, the devices 112 are user devices, such as described herein (e.g., a user device 200, as shown in FIG. 2). The computing platform 100 can communicate with the devices over a network 114. The network 114 can include a wired and/or wireless network. For example, the network 114 can include a public network (e.g., the Internet), a private network (e.g., a local area network (LAN)), or a combination thereof (e.g., a virtual private network). The computing platform 100 can provide the grapheme-phoneme model 106 using the network interface 110 over the network 114 to each device 112. Each device 112 can employ the grapheme-phoneme model 106 for grapheme-phoneme correspondence learning. For example, during grapheme-phoneme correspondence learning, the grapheme-phoneme model 106 can be used to determine whether a sound made by a human corresponds to a phoneme for a respective grapheme. As described herein, the respective grapheme can be rendered on a display, for example, of the user device.

The computing platform 100 can include an input device 112, such as a keyboard, a mouse, and/or the like. The input device 112 can be used to provide relevant training parameters (e.g., weight values) for the trainer 108 during training of the grapheme-phoneme model. In some examples, the input device 112 can be used to initiate a tester 114 following training of the grapheme-phoneme model 106 to verify (e.g., test) a performance of the grapheme-phoneme model 106 to determine whether the grapheme-phoneme model is making accurate predictions (e.g., within a defined or specified range, for example, based on user input via the input device 112).

In some examples, the memory 102 includes a spectrogram generator 116 and a data augmentor 118. The spectrogram generator 116 can be programmed to receive or retrieve audio data 120, which can be stored in the memory 102, or remotely (e.g., on another device). The audio data 120 can represent one or more sounds corresponding to one or more phonemes for corresponding graphemes. The recordings may be stored as m4a files, or in another file format. The spectrogram generator 116 can be programmed to provide the spectrogram data 122 based on the audio data 120, which can be provided or received by the data augmentor 118. By way of example, the spectrogram generator 116 can be programmed to transform the audio data 120 into a Mel-Scaled spectrogram to provide the spectrogram data 122. In some examples, the spectrogram data 122 includes spectrograms that are labeled (e.g., identifying a phoneme for a corresponding grapheme). For example, a user can employ the input device 112 to label corresponding spectrograms of spectrogram data 122. Because in some instances the spectrogram data 122 includes labeled spectrograms, the grapheme-phoneme model 106 can be trained using supervised learning by the trainer 108.

The data augmentor 118 can be programmed to augment the spectrogram data 122 to provide augmented spectrogram data 124 for use in training and testing of the grapheme-phoneme model 106. For example, the data augmentor 118 can be programmed to randomly augment the spectrogram data 122 to provide the augmented spectrogram data 124. The augmentation can include scaling, shifts, noise and blanking using a spec-augmentation method, for example, as described in "SpecAugment A Simple Data Augmentation Method for Automatic Speech Recognition," Daniel S. Park et al. Thus, in some examples, the data augmentor 118 can include a number of augmentation components (e.g., modules) for augmentation of the spectrogram data 122 to provide the augmented spectrogram data 124.

The augmented spectrogram data 124 can include augmented spectrogram training data 126 (referred to herein as "training data") and augmented spectrogram testing data 128 ("referred to herein as "testing data"). In some examples, the data augmentor 118 can be programmed to tag (e.g., flag) a portion of the augmented spectrogram data 124 as the training data 126, and another portion of the augmented spectrogram data 124 as the testing data 128. In some examples, the flagging of the augmented spectrogram data 124 to provide the testing and training data 126 and 128 can be based on user input at the input device 112.

For example, the trainer 108 can be programmed to train the grapheme-phoneme model 106 over a number of training phases, such as two-training phases. During a first training phase, trainer 108 can be programmed to train the grapheme-phoneme model 106 based on a first portion of the training data 126 and re-train the grapheme-phoneme model 106 during a second training phase based on a second portion of the training data 126 to provide a trained grapheme-phoneme model for determining whether a sound made by a human is representative of a phoneme for a grapheme. In some examples, learning algorithms may be used by the trainer 108 during training of the grapheme-phoneme model 106. For example, Stochastic Gradient Descent and Adam algorithms, which are gradient descent optimizers, can be used by the trainer 108 during the training of the grapheme-phoneme model 106. The tester 114 can be programmed to execute the grapheme-phoneme model 106 to predict a corresponding grapheme-phoneme relationship based on the testing data 128, as shown in FIG. 1, to verify a performance of the grapheme-phoneme model 106. The grapheme-phoneme model 106 after training can be provided to a corresponding device 112 for use in grapheme-phoneme correspondence learning, such as described herein with respect to FIG. 2.

Grapheme-Phoneme Correspondence Learning

FIG. 2 is an example of a user device 200 for grapheme-phoneme correspondence learning. The user device 200 may be any type of computing device, such as a portable computing device (e.g., mobile phone, tablet, and/or the like), or stationary device (e.g., a desktop computer) that the user can access or use for learning grapheme-phoneme correspondences. In some examples, the user device 200 may be implemented on a device similar to a computing device as described herein with respect to FIG. 1. The user device 200 can include a processor 202 and a memory 204. By way of example, the memory 204 can be implemented, for example, as a non-transitory computer storage medium, such as volatile memory (e.g., random access memory), non-volatile memory (e.g., a hard disk drive, a solid-state drive, a flash memory, or the like) or a combination thereof. The processor 202 could be implemented, for example, as a processor core. The memory 204 can store machine-readable instructions that can be retrieved and executed by the processor 202 to implement grapheme-phoneme correspondence learning.

For example, the user device 200 could be implemented in a computing cloud. In such a situation, features of the user device 200, such as the processor 202, the memory 204, and a network interface 224 could be representative of a single instance of hardware or multiple instances of hardware with applications executing across multiple of instances (e.g., distributed) of hardware (e.g., computers, routers, memory, processors, or a combination thereof). Alternatively, the user device 200 could be implemented on a single dedicated server or workstation.

The memory 204 can include a grapheme-phoneme module 206 that can be programmed for grapheme-phoneme correspondence learning. The grapheme-phoneme module 206 can communicate with a grapheme-phoneme database 208. The grapheme-phoneme database 206 can store a number of graphemes. For example, the grapheme-phoneme database 206 can include an alphabet, such an English alphabet, Arabic alphabet, Chinese alphabet, or a different alphabet. The grapheme-phoneme database 206 can include a number of letters, sequence of letters representing a sound, words, syllables, and/or morphemes.

For example, to teach a human a grapheme-phoneme correspondence (e.g., one or more letter and/or word sound correspondences), the grapheme-phoneme module 206 can be programmed to generate a grapheme GUI 210 that includes one or more graphemes (e.g., letters, words, etc.) for pronunciation by the user. The grapheme-phoneme module 206 can identify the one or more graphemes for generating the grapheme GUI 210 based on the grapheme-phoneme database 208. For example, the grapheme-phoneme module 206 can identify one or more sequential graphemes (e.g., neighboring letters in an alphabet), or one or more random graphemes (e.g., non-neighboring letters in an alphabet), or a combination thereof.

The user device 200 can include or communicate with a display 212 for rendering the grapheme GUI 210. The display 212 can correspond to an output device, such as a screen, a touch-screen display, a monitor, a printer, a projector, wearable reality glasses, or another type of display. In some examples, the user device 200 can include or communicate with an input device 214 for interacting with elements of the GUI 210. For example, the input device 214 can include a touchscreen, a keyboard, a mouse, a stylus pen, and/or the like. In some instances, the display 212 and the input device 214 may be implemented as a single device.

In some examples, the grapheme GUI 210 may prompt the user to select one of the one or more graphemes rendered on the display 212 for pronunciation. A selected grapheme can be emphasized on the grapheme GUI 210 to distinguish the selected grapheme from other graphemes rendered on the display 212 so that the user can be visually alerted to a proper grapheme for grapheme-phoneme correspondences learning. The grapheme-phoneme module 206 can be programmed to receive grapheme selection data identifying the selected grapheme for grapheme-phoneme correspondences learning, which can be generated in response to the user (e.g., via the input device 210). In some examples, the grapheme-phoneme module 206 can identify the selected grapheme of the one or more graphemes for pronunciation.

The human, in response to being prompted to pronounce the selected grapheme, can speak the selected grapheme, which is represented as a user sound 216 in the example of FIG. 2. A microphone 218 can capture the user sound 216 and generate audio data 220 that is representative of the user sound 216. The audio data 220 can be provided to a trained model 222 corresponding to the grapheme-phoneme model 106, as shown in FIG. 1. Thus, reference can be made to the example of FIG. 1 in the example of FIG. 2.

In some instances, the user device 200 includes a network interface 224. The network interface 224 (e.g., a network interface card) can be configured to communicate with other computing platforms via a network (e.g., the network 114, as shown in FIG. 1). In some examples, the network interface 224 is used to communicate with the computing platform 100, as shown in FIG. 1, to receive the grapheme-phoneme model 106. While the example of FIG. 2 illustrates the trained model 222 as separate from the grapheme-phoneme module 206, in some instances, the grapheme-phoneme module 206 includes the trained model 222.

The trained model 222 can process the audio data 220 to determine whether the sound made by the human sound 216 corresponds to a phoneme for the selected grapheme. The trained model 222 can communicate with the grapheme-phoneme module 206 to receive the selected grapheme and use this information to determine whether the sound made by human user sound 216 corresponds to the phoneme for the selected grapheme.

In some instances, the trained model 222 can determine how closely the sound made by the user corresponds to the phoneme for the selected grapheme. That is, the trained model 222 can determine an accuracy or confidence in the accuracy of the pronunciation of the grapheme by the user relative to an actual or baseline pronunciation of the grapheme. The trained model 222 can output sound accuracy data indicating a sound similarity level for a sound made by a human matching or being similar to a phoneme for a grapheme. The sound similarity level can correspond to the accuracy of the pronunciation. Thus, the sound accuracy data can characterize how closely the pronunciation of the grapheme made by the user corresponding to the user sound 216 matches or is similar to the actual or baseline pronunciation of the grapheme corresponding to an actual or baseline phoneme. The accuracy may be represented as a percentage value, a whole number value, or a decimal number value.

In some examples, the sound accuracy data can be provided to the grapheme-phoneme module 206 to update the grapheme GUI 210 to notify the user of the sound similarity level for the sound made by the human for the grapheme. Thus, the grapheme GUI 210 can be updated to visually indicate to the user how well the user is pronouncing the selected grapheme.

In some instances, if the sound similarity level is below a sound similarity threshold (e.g., an accuracy threshold), the grapheme-phoneme module 206 can update the grapheme GUI 210 to alert the user to repeat the selected grapheme. The grapheme-phoneme module 206 can continuously compare the sound similarity level for the selected grapheme and one or more subsequent phonemes and alert the user to repeat the selected grapheme until the quality level is greater than or equal to the sound similarity threshold. While examples are described herein in which the trained model 222 determines the sound similarity level for the selected grapheme, in other examples, the grapheme-phoneme module 206 can be programmed to determine the sound similarity level in a same or similar manner as described herein.

In additional or alternative examples, the grapheme-phoneme module 206 can be programmed to output artificial audio data 226. The grapheme-phoneme module 206 can be programmed to output the artificial audio data 226 in response to determining that the user sound 216 does not correspond to the phoneme for the selected grapheme rendered on the display 212. In some examples, the grapheme-phoneme module 206 can be programmed to output the artificial audio data 226 in response to determining that the sound similarity level is not within a given value (e.g., degree, percentage, etc.) of the sound similarity threshold, or is less than the sound similarity threshold.

The artificial audio data 226 can represent sound referred to as an artificial sound 228 that can represent the phoneme for the selected grapheme and thus can be used to provide a correct or proper pronunciation for the selected grapheme. The term "artificial" as used herein relating to sound is used to indicate that the sound is generated by a speaker rather than a human. Thus, in some examples, the artificial sound 228 can represent a machine generated sound, or a previously captured sound for the selected grapheme made by a human.

The artificial audio data 226 can be provided to a speaker 230 of the device 200. The speaker 230 can convert the artificial audio data 226 into sound energy corresponding to the artificial sound 228. In some examples, if the user provides the proper pronunciation (e.g., the phoneme) for the selected grapheme, the grapheme-phoneme module 206 can update the grapheme GUI 210, such that a different grapheme of the one more graphemes is selected for grapheme-phoneme correspondence learning. In some examples, the grapheme-phoneme module 206 can be programmed to query the grapheme-phoneme database 208 to identify a correct phoneme for the select grapheme and cause the speaker 230 to output the artificial sound 228 based on the identified phoneme. Thus, in some examples, the grapheme-phoneme database 208 can store audio data representative of different sounds corresponding to phonemes for respective graphemes. As such, in some examples, the graphemes in the grapheme-phoneme database 208 can be associated (e.g., logically linked) to audio data representative of a corresponding phoneme.

Grapheme-Phoneme Correspondence Learning Tool

Accordingly, the user device 200 can be implemented as a grapheme-phoneme correspondence learning tool enabling a user to learn through repetition grapheme-phoneme correspondences. The tool employs a feedback mechanism that models a proper sounding of a grapheme (e.g., as the artificial audio data 226) so that the user can practice pronouncing the grapheme over a number of repetitions to learn a corresponding phoneme for the grapheme. For example, the tool can recognize and/or classify a spoken letter sound and provide feedback in the event the human mispronounces the letter, model the correct sound, and allow the user (e.g., a student) to repeat the letter, and then provide further feedback. In some examples, the tool can be used by elementary school teachers, tutors, and/or parents to assist students or children in learning letter sound independently (e.g., without an immediate instructor). The grapheme-phoneme correspondence learning tool as described herein can be used as part of an educational program or as part of an intervention to improve students in need. In some instances, the tool can be used as an assistance tool for diagnostics.

User-Interface

Figure 3:
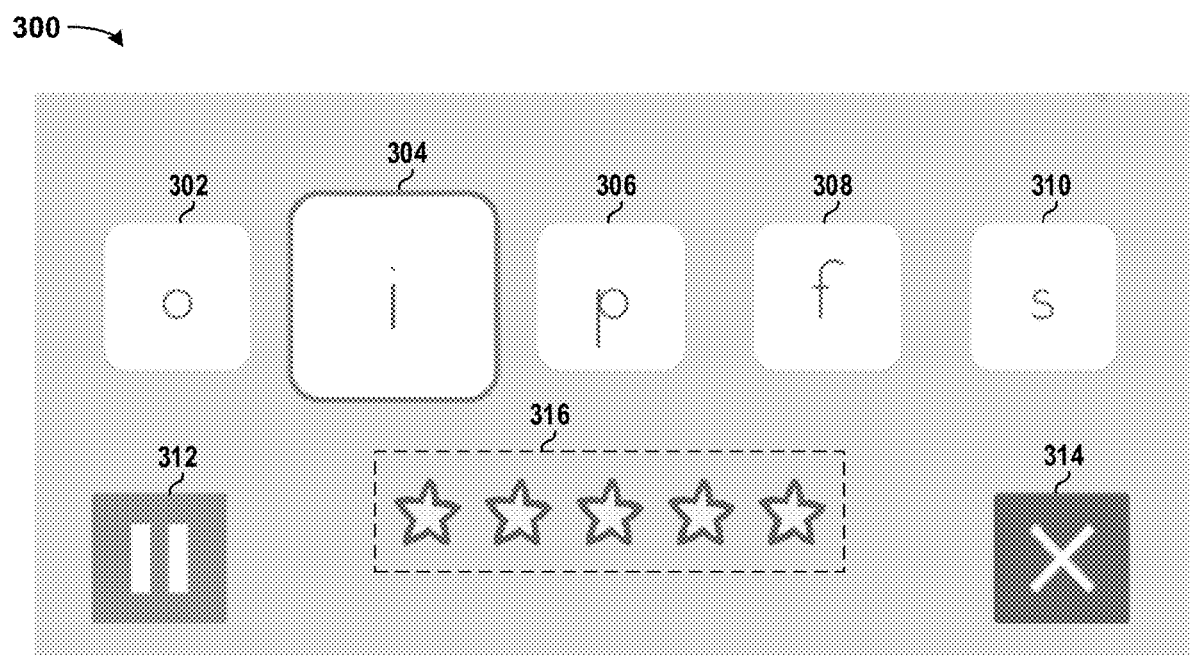
FIG. 3 is an example of a grapheme graphical user interface (GUI).

FIG. 3 is an example of a grapheme GUI 300, which can correspond to the grapheme GUI 210, as shown in FIG. 2. Thus, reference can be example of FIGS. 1-2 in example of FIG. 3. The grapheme GUI 300 includes a number of grapheme elements 302-308 representative of a corresponding grapheme. In the example of FIG. 3, the graphemes are English letters, such as "o," "i," "p," "f," and "s." For example, to practice a grapheme-phoneme correspondence, the user or the grapheme-phoneme module 206 can select a given grapheme element of the grapheme elements 302-308. In the example of FIG. 3, the grapheme element 304 is emphasized with a border to indicate the selection of the grapheme element 304.

In some examples, the grapheme GUI 300 includes a start element 312 and a stop element 314. A user (e.g., human) can interact with the start element 312 of the grapheme GUI 300 to initiate learning one or more grapheme-phoneme correspondences, and the stop element 314 to terminate or stop learning the one or more grapheme-phoneme correspondences. The grapheme GUI 300 can further include a given number of star elements 316, which can be used to provide a measure of how many correct grapheme-phoneme correspondences. If a user (e.g., student) gets all five (5) grapheme-phoneme correspondences in a given stage correct, the user can move onto a next stage.

By way of further example, the grapheme-phoneme module 206 can be programmed to output the grapheme GUI 300 with a series of letters. A student can be prompted to speak each letter, one after another in response to the grapheme-phoneme module 206. For example, the grapheme-phoneme module 206 can output instruction audio data requesting that the student speak a respective letter as identified on the grapheme GUI 300, such as the grapheme element 304. The trained model 222, in some instances, implemented as a deep neural network, beneath the graphical GUI 300 is trained to recognize individual letter sounds spoken out loud (e.g., in isolation) by the student. The trained model 222 is linked to the grapheme-phoneme module 206. If the student mispronounces the respective letter, the trained model 222 can provide data indicating an incorrect pronunciation, which the grapheme-phoneme module 206 can process to provide a correct pronunciation for the respective letter so that the student can repeat the respective letter. The grapheme-phoneme module 206 can provide the student a mix of letters with which the student is struggling and letters that the student has mastered.

Example Grapheme-Phoneme Model

Figure 4:
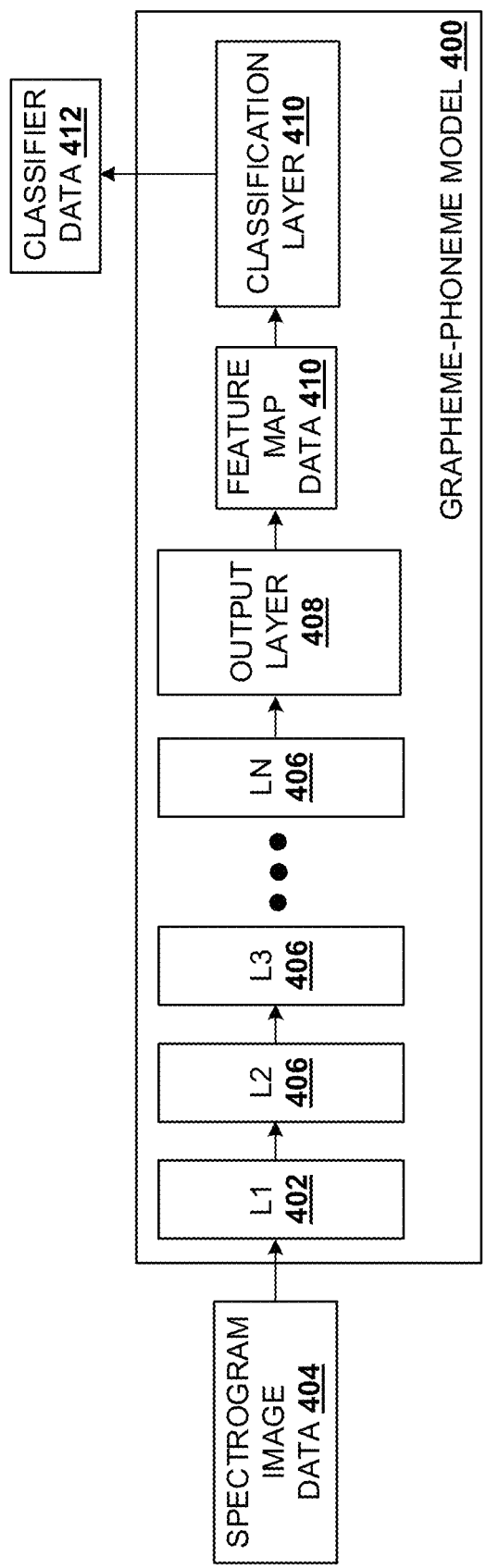
FIG. 4 is an example of a grapheme-phoneme model.

FIG. 4 is an example of a grapheme-phoneme model 400. In some examples, the grapheme-phoneme model 400 is representative of the grapheme-phoneme model 106, as shown in FIG. 1. In the example of FIG. 4, the grapheme-phoneme model 400 is implemented as a neural network model. The grapheme-phoneme model 400 can be trained to determine whether captured audio data (e.g., the captured audio data 218, as shown in FIG. 2) corresponds to a phoneme for a grapheme displayed on a grapheme GUI (e.g., the grapheme GUI 210, as shown in FIG. 2, or the grapheme GUI 300, as shown in FIG. 1). Thus, reference can be example of FIGS. 1-3 in example of FIG. 4. For example, the grapheme-phoneme model 400 can be implemented as a residual convolution network (RCN) model, such as a MobileNetV2 RCN model, and in other examples, a combination of a Wav2Vec model and a feed-forward neural network model. The grapheme-phoneme model 400 can be implemented in TensorFlow 2.

For example, the grapheme-phoneme model 400 can include an input layer 402 (identified as "L1" in the example of FIG. 4). The input layer 402 can have a dimensionality similar to a dimensionality of a spectrogram image of spectrogram data 404. The spectrogram data 404 can correspond to the spectrogram data 122, as shown in FIG. 1. The spectrogram image can include a plurality of pixels that can have a defined bit-width, and each node of the input layer 402 can be programmed to process a set of pixels of the plurality of pixels. In some examples, the input layer 402 corresponds to spectrograms of the spectrogram data 122 and can contain neurons that can accept 32-bit float values.

The grapheme-phoneme model 400 can include an N number of intermediate layers 406 (identified as "L2," "L3," "LN" in the example of FIG. 4), wherein "N" is an integer value. Each intermediate layer 406 can have a respective dimensionality (e.g., size) and include nodes for further processing of outputs provided by an upstream layer. In some examples, the intermediate layers 406 can be referred to as hidden layers. Each of the layers 406 may include a number of activation nodes. Nodes can be connected with another node of a similar layer or a different layer, and each connection can have a particular weight. The weights can be determined by the trainer 108, or based on user input at the input device 112, as shown in FIG. 1.

The grapheme-phoneme model 400 can further include an output layer (a feature map output layer) 408 and a classification layer 410. The output layer 408 can be a feature vector output layer that can provide a feature vector representative of sound differences between two or more phonemes, shown as feature map data 410 in the example of FIG. 4. The output layer 408 can be used for embedding with vectors for calculating differences between individual pronunciations. In an example, the output layer 408 can include 128 elements and the classification layer can include 26 elements (e.g., one per each letter of an alphabet.) The classification layer 410 provides a phoneme class mapping, shown as classifier data 412 in the example of FIG. 4, for example, based on the feature map data 410. The phoneme class mapping includes phoneme classes for phonemes. The feature vector map and the phoneme class mapping can be used by the trainer 108 during training of the grapheme-phoneme model 400, such as during a first training phase of the grapheme-phoneme model 400.

During a second training phase of the grapheme-phoneme model 400, the trainer 108 can be programmed to freeze non-output classification layers of the grapheme-phoneme model 400 to train only classification layers. During the second training phase, the grapheme-phoneme model 400 can be fine-tuned to improve the prediction accuracy of the grapheme-phoneme model 400. The trainer 108 can be programmed to train the grapheme-phoneme model 400 during each of the first and second training phases by minimizing a cost function. In some examples, the grapheme-phoneme model 400 after being trained can be stored on a user device, such as the user device 200, and used for grapheme-phoneme correspondence learning, such as described herein.

Figure 5:
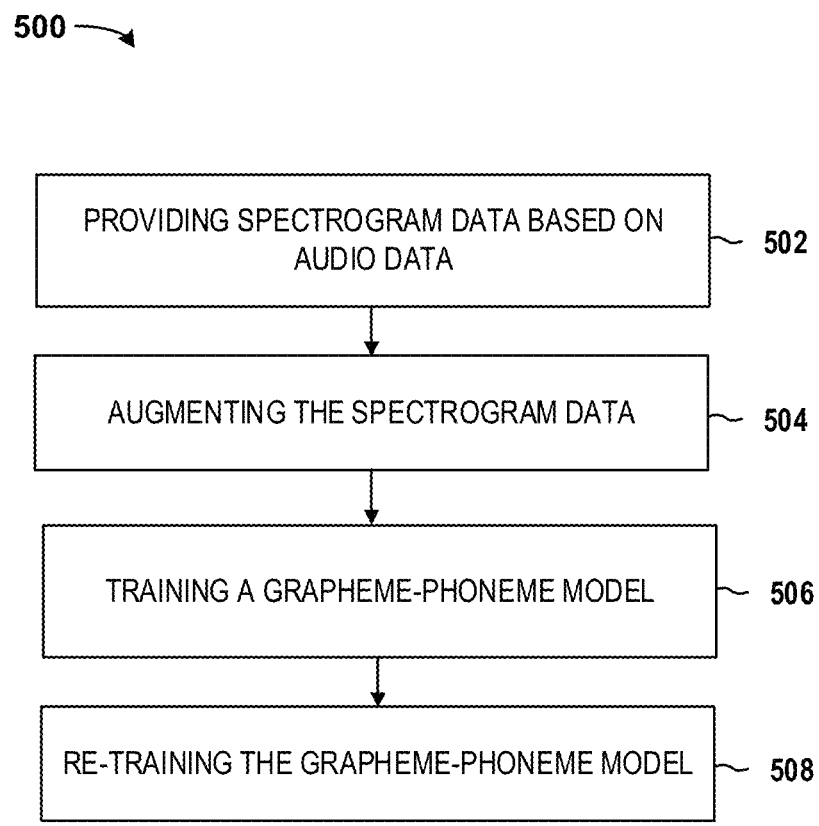
FIG. 5 is an example of a method for training a grapheme-phoneme model.
Figure 6:
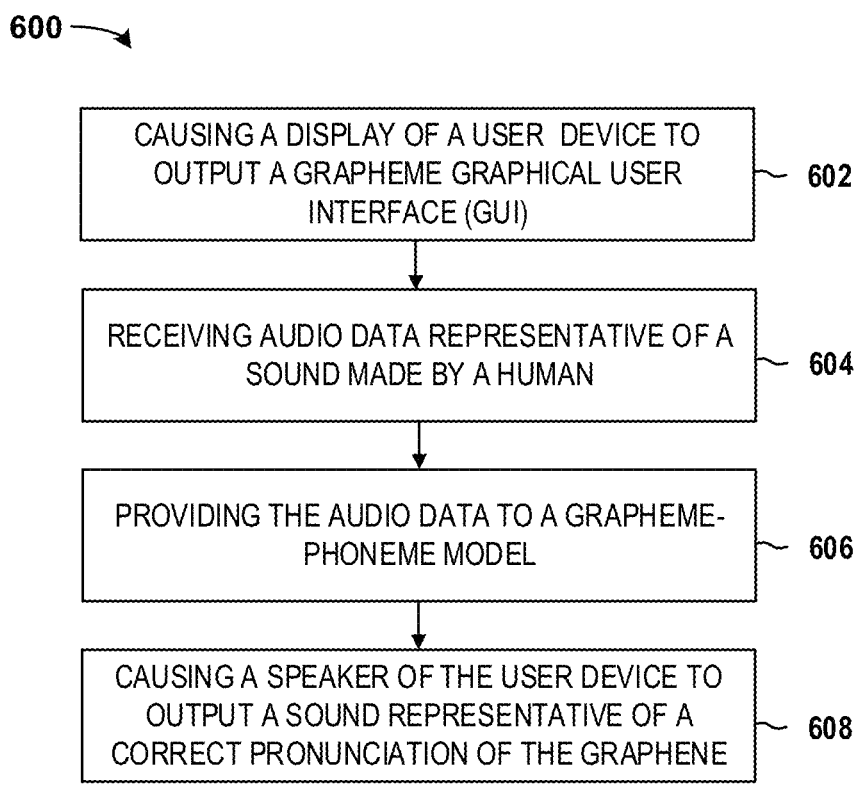
FIG. 6 is an example of a method for grapheme-phoneme correspondence learning.

In view of the foregoing structural and functional features described above, example methods will be better appreciated with reference to FIGS. 5-6. While, for purposes of simplicity of explanation, the example methods of FIGS. 5-6 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

Training

FIG. 5 is an example of a method 500 for training a grapheme-phoneme model (e.g., the grapheme-phoneme model 106, as shown in FIG. 1, the grapheme-phoneme model 400, as shown in FIG. 4) for determining whether a sound (e.g., the user sound 216, as shown in FIG. 2) made by a human corresponds to a phoneme for a grapheme rendered on a display of a user device (e.g., the user device 200, as shown in FIG. 2). The method 500 can be implemented by a computing platform, such as the computing platform 100, as shown in FIG. 1. Thus, reference can be made to the example of FIGS. 1-4 in the example of FIG. 5.

The method 500 can begin at 502 by providing (e.g., via the spectrogram generator 116, as shown in FIG. 1) spectrogram data (e.g., the spectrogram data 122, as shown in FIG. 1) based on audio data (e.g., the audio data 120, as shown in FIG. 1) representative of one or more sounds corresponding to one or more phonemes. At 504, augmenting (e.g., via the data augmentor 118, as shown in FIG. 1) the spectrogram data to provide augmented spectrogram data (e.g., the augmented spectrogram data 126, as shown in FIG. 1). At 506, training (e.g., via the trainer 108, as shown in FIG. 1) the grapheme-phoneme model during a first training phase based on a first portion of the augmented spectrogram data. At 508, re-training (e.g., via the trainer 108, as shown in FIG. 1) the grapheme-phoneme model during a second training phase based on a second portion of the augmented spectrogram data to provide a trained grapheme-phoneme model (e.g., the trained model 222, as shown in FIG. 2).

Operation

FIG. 6 is an example of a method 600 for grapheme-phoneme correspondence learning (e.g., one or more letter and/or word sound correspondence learning). The method 600 can be implemented by a user device, such as the user device 112, as shown in FIG. 1, or the user device 200, as shown in FIG. 2. Thus, reference can be made to the example of FIGS. 1-4 in the example of FIG. 6. The method 600 can begin at 602 by causing a display (e.g., the display 212, as shown in FIG. 2) of the user device to output a grapheme GUI (e.g., the grapheme GUI 210, as shown in FIG. 2, or the grapheme GUI 300, as shown in FIG. 3) with a grapheme.

At 604, receiving audio data (e.g., the captured audio data 220, as shown in FIG. 2) representative of a sound (e.g., the user sound 216, as shown in FIG. 2) made by the human. At 606, providing the audio data to a grapheme-phoneme model (e.g., the trained model 222, as shown in FIG. 2) to determine whether the sound made by the human corresponds to a phoneme for the grapheme. At 608, causing a speaker (e.g., the speaker 230, as shown in FIG. 2) of the user device to output an artificial sound (e.g., the artificial sound 228, as shown in FIG. 2) representative of the phoneme for the grapheme in response to the grapheme-phoneme model determining that the sound made by the human does not correspond to the phoneme for the grapheme.

The terminology used herein is for the purpose of describing particular embodiments only and is not intended to limit this disclosure. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of this disclosure. In addition, many modifications will be appreciated by those skilled in the art to adapt a particular instrument, situation, or material to embodiments of the disclosure without departing from the essential scope thereof. Therefore, it is intended that the invention herein not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 7. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices.

As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, MEMS, nano-technological storage devices, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general-purpose computer, special purpose computer, or other programmable data processing apparatus (or a combination of devices and circuits) to produce a machine, such that the instructions, which execute via the processor, implement the functions specified in the block or blocks. Embodiments also have been described herein with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 7:
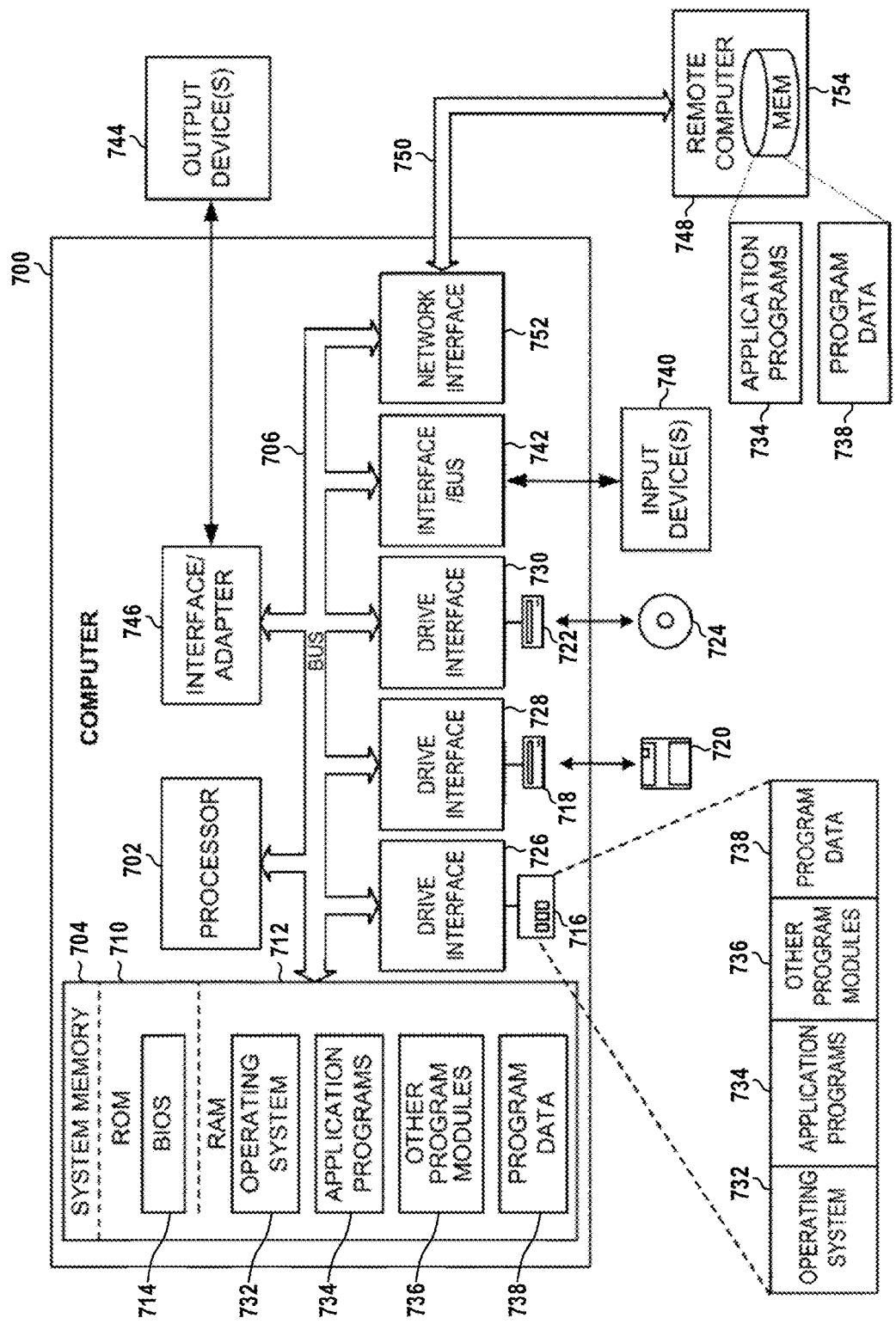
FIG. 7 depicts an example computing environment.

In this regard, FIG. 7 illustrates one example of a computer system 700 that can be employed to execute one or more embodiments of the present disclosure. In some examples, the computer system 700 corresponds to the computing platform 100, as shown in FIG. 1, and in other examples to the user device 200, as shown in FIG. 2. Thus, reference can be made to the examples of FIGS. 1-2 in the example of FIG. 7. The computer system 700 can be implemented on one or more general purpose networked computer systems, embedded computer systems, routers, switches, server devices, client devices, various intermediate devices/nodes or standalone computer systems. Additionally, computer system 700 can be implemented on various mobile clients such as, for example, a personal digital assistant (PDA), laptop computer, pager, and the like, provided it includes sufficient processing capabilities.

Computer system 700 includes processing unit 702, system memory 704, and system bus 706 that couples various system components, including the system memory 704, to processing unit 702. Dual microprocessors and other multi-processor architectures also can be used as processing unit 702. System bus 706 may be any of several types of bus structure including a memory bus or memory controller, a peripheral bus, and a local bus using any of a variety of bus architectures. System memory 704 includes read only memory (ROM) 710 and random access memory (RAM) 712. A basic input/output system (BIOS) 714 can reside in ROM 710 containing the basic routines that help to transfer information among elements within computer system 700.

Computer system 700 can include a hard disk drive 716, magnetic disk drive 718, e.g., to read from or write to removable disk 720, and an optical disk drive 722, e.g., for reading CD-ROM disk 724 or to read from or write to other optical media. Hard disk drive 716, magnetic disk drive 718, and optical disk drive 722 are connected to system bus 706 by a hard disk drive interface 726, a magnetic disk drive interface 728, and an optical drive interface 730, respectively. The drives and associated computer-readable media provide nonvolatile storage of data, data structures, and computer-executable instructions for computer system 700. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 710, including operating system 732, one or more application programs 734, other program modules 736, and program data 738. The application programs 734 and program data 738 can include functions and methods programmed for training a grapheme-phoneme model and/or learning grapheme-phoneme correspondences, such as shown and described herein. A user may enter commands and information into computer system 700 through one or more input devices 740, such as a pointing device (e.g., a mouse, touch screen), keyboard, microphone, joystick, game pad, scanner, and the like. These and other input devices 740 are often connected to processing unit 702 through a corresponding port interface 742 that is coupled to the system bus, but may be connected by other interfaces, such as a parallel port, serial port, or universal serial bus (USB). One or more output devices 744 (e.g., display, a monitor, printer, projector, or other type of displaying device) is also connected to system bus 706 via interface 746, such as a video adapter.

Computer system 700 may operate in a networked environment using logical connections to one or more remote computers, such as remote computer 748. Remote computer 748 may be a workstation, computer system, router, peer device, or other common network node, and typically includes many or all the elements described relative to computer system 700. The logical connections, schematically indicated at 750, can include a local area network (LAN) and a wide area network (WAN). When used in a LAN networking environment, computer system 700 can be connected to the local network through a network interface or adapter 752. When used in a WAN networking environment, computer system 700 can include a modem, or can be connected to a communications server on the LAN. The modem, which may be internal or external, can be connected to system bus 706 via an appropriate port interface. In a networked environment, application programs 734 or program data 738 depicted relative to computer system 300, or portions thereof, may be stored in a remote memory storage device 754.

What have been described above are examples. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on."

What is claimed is:

1. A system for teaching grapheme-phoneme correspondence comprising:
  memory to store machine-readable instructions; and
  one or more processors to access the memory and execute the machine-readable instructions, the machine-readable instructions comprising:
    a spectrogram generator programmed to transform audio data into spectrogram data, the audio data being representative of one or more sounds corresponding to one or more phonemes;
    a data augmentor programmed to augment the spectrogram data to provide augmented spectrogram data; and
    a trainer programmed to train a grapheme-phoneme model for grapheme-phoneme correspondence learning during a first training phase based on a first portion of the augmented spectrogram data, and re-train the grapheme-phoneme model during a second training phase based on a second portion of the augmented spectrogram data to provide a trained grapheme-phoneme model, such that the trained grapheme-phoneme model is programmed to determine whether a sound made by a human is representative of a phoneme for a grapheme.

2. The system of claim 1, wherein the grapheme-phoneme model is a neural network model comprising a plurality of layers including at least one output classification layer.

3. The system of claim 2, wherein the trainer is programmed to train the neural network model during the first training phase based on the first portion of the augmented spectrogram data, and re-train the neural network model during the second training phase based on the second portion of the augmented spectrogram data, the trainer being programmed to freeze non-output classification layers of the neural network model during the second training phase.

4. The system of claim 3, wherein the plurality of layers includes a feature vector output layer to provide a feature vector representative of sound differences between two or more phonemes, and the trainer is programmed to train the neural network model based on the feature vector.

5. The system of claim 4, wherein the at least one output classification layer provides a phoneme class mapping, the phoneme class mapping comprising phoneme classes for phonemes, and the trainer is programmed to train the neural network model based on the phoneme class mapping.

6. The system of claim 5, wherein the trainer is programmed to train the neural network model during each of the first and second training phases by minimizing a cost function.

7. The system of claim 6, wherein the machine-readable instructions further comprise a tester, and the augmented spectrogram data comprises augmented spectrogram training data and augmented spectrogram testing data, the first and second portions of the augmented spectrogram data corresponds to first and second portions of the augmented spectrogram training data, and the tester is programmed to execute the neural network model to predict a corresponding grapheme-phoneme relationship based on the augmented spectrogram testing data.

8. The system of claim 1, wherein the audio data corresponds to first audio data, and the trained grapheme-phoneme model is a trained neural network model and is stored in a memory of a user device or a cloud computing environment, the user device or the cloud computing environment comprising one or more processors to access the memory and execute machine readable instructions to:
  receive second audio data representative of the sound made by the human in response to a grapheme being displayed on a display of the user device during the grapheme-phoneme correspondence learning; and
  determine using the trained neural network model whether the sound made by the human is representative of a phoneme for the grapheme displayed on the display of the user device corresponding to determining whether the human correctly pronounced the grapheme.

9. The system of claim 8, wherein the machine readable instructions of the user device or the cloud computing environment further comprise a grapheme-phoneme module, and the trained neural network model is programmed to provide an indication to the grapheme-phoneme module that the sound made by the human does not correspond to the phoneme for the grapheme.

10. The system of claim 9, wherein the user device comprises a speaker, and the grapheme-phoneme module is programmed to query a grapheme-phoneme database to identify third audio data representative of the phoneme for the grapheme and cause the speaker to output a sound representative of the phoneme based on the third audio data to provide the human with a correct pronunciation.

11. The system of claim 10, wherein the grapheme-phoneme module is programmed to output a grapheme graphical user interface (GUI) that includes the grapheme and cause the grapheme GUI to be rendered on the display of the user device.

12. A device for teaching grapheme-phoneme correspondence comprising
a display configured to render a grapheme graphical user interface (GUI) that includes one or more graphemes for pronunciation by a human to teach the human a grapheme-phoneme correspondence;
a speaker;
a microphone configured to capture a sound made by the human for a select grapheme of the one or more graphemes displayed on the display and provide audio data;
memory to store machine-readable instructions; and
one or more processors to access the memory and execute the machine-readable instructions, the machine-readable instructions comprising:
a trained machine learning (ML) model programmed to determine whether the sound made by the human corresponds to a phoneme for the selected grapheme displayed on the display based on the audio data; and
a grapheme-phoneme module programmed to cause the speaker to output a sound representative of the phoneme for the grapheme displayed on the display in response to the trained ML model determining that the sound made by the human does not match the phoneme for the selected grapheme on the display corresponding to determining that the sound made by the human for the selected grapheme is incorrect.

13. The device of claim 12, wherein the grapheme-phoneme module is programmed to query a grapheme-phoneme database to identify the phoneme for the selected grapheme.

14. The device of claim 13, wherein the grapheme-phoneme module is programmed to output the grapheme GUI, the grapheme GUI being configured to prompt the human to select one of the one or more graphemes rendered on the display for pronunciation.

15. The device of claim 14, wherein the trained ML model is a neural network model and is trained during a first training phase based on a first portion of augmented spectrogram data, and re-trained during a second training phase based on a second portion of the augmented spectrogram data, and wherein during the second training phase non-output classification layers of the neural network model are frozen.

16. The device of claim 14, wherein the device is one of a tablet, a mobile phone, and a computer.

17. A method for teaching grapheme-phoneme correspondence comprising:
causing a display of a device to output a grapheme graphical user interface (GUI) that includes a grapheme for pronunciation by a human to teach the human a grapheme-phoneme correspondence;
receiving audio data representative of a sound made by the human based on the grapheme displayed on the display;
providing the audio data to a trained neural network model to determine whether the sound made by the human corresponds to a phoneme for the grapheme; and
causing a speaker of the device to output a sound representative of the phoneme for the grapheme in response to determining that the sound made by the human does not correspond to the phoneme for the grapheme.

18. The method of claim 17, further comprising querying a grapheme-phoneme database to identify the phoneme for the grapheme in response to an indication from the neural network model that the sound made by the human does not correspond to the phoneme for the grapheme.

19. The method of claim 18, further comprising providing the trained neural network model in response to a two step-training phase in which during a second training phase after a first training phase of the two-step training phase non-output classification layers of the neural network model are frozen.

20. The method of claim 18, wherein the trained neural network model is a neural network model trained during the first training phase of the two-step training phase based on a first portion of augmented spectrogram data, and re-trained during the second training phase of the two-step training phase based on a second portion of the augmented spectrogram data.

21. A computer-implemented system comprising:
a tool configured to output a user-interface display view that shows a user a series of graphemes, prompts the user to say the sound each grapheme makes, and captures one or more spoken responses from the user in an audio file;
a trained neural network model configured to recognize individual sounds spoken out loud in isolation;
wherein the tool outputs the audio file to the trained neural network model to evaluate whether a response was correct or mistaken; and
wherein the tool includes a feedback mechanism which is configured to provide modeling and repetition to the user when a mistaken response is detected.

22. The computer-implemented system of claim 21,
further comprising a spectrogram generator to generate spectrogram data based on the audio file corresponding to one or more individual sounds spoken out loud in isolation, the trained neural network model being programmed to determine whether each of the one or more individual sounds spoken out loud corresponds to one of the series of graphemes on the user-interface display, wherein:
the user is a student;
the tool includes a microphone to capture the one or more individual sounds spoken out loud in isolation by the student to provide the audio file; and
the feedback mechanism is configured to model a proper sounding of the grapheme to the student when the mistaken response is detected by the trained neural network and cause a speaker of the tool to provide the proper sounding of the grapheme based on artificial sound data for the grapheme to the student so that the student can learn the proper sounding of the grapheme.

23. The device of claim 12, wherein the trained ML model is configured to:
determine how closely the sound made by the human corresponds to a phoneme for a grapheme rendered on the display of the user device to determine whether the human is correctly pronouncing the grapheme;
output sound accuracy data indicating a sound similarity level for the sound made by the human matching or being similar to the phoneme for the grapheme; and
cause the display of the user device to visually indicate if the human is pronouncing the selected grapheme correctly based on the sound accuracy data.

* * * * *